United States Patent [19]

Hashimoto

[11] Patent Number: 5,749,058
[45] Date of Patent: May 5, 1998

[54] ROBOT SAFETY SYSTEM FOR CONNECTING PERIPHERAL DEVICE TO A ROBOT CONTROLLER

[75] Inventor: Yoshiki Hashimoto, Hadano, Japan

[73] Assignee: Fanuc Ltd., Yamanashi, Japan

[21] Appl. No.: 469,827

[22] Filed: Jun. 6, 1995

[30] Foreign Application Priority Data

Jun. 29, 1994 [JP] Japan .................... 6-147288

[51] Int. Cl.$^6$ ...................... G06F 7/70; G05B 19/04
[52] U.S. Cl. ...................... 701/23; 701/2; 395/80;
395/82; 395/99; 395/94; 318/568.11; 318/568.16;
901/49; 901/50; 364/184; 364/188
[58] Field of Search .................. 395/500, 84, 87,
395/95, 96, 97, 86, 99, 83, 80, 82, 93,
94, 912; 364/424.02, 424.01, 167.01, 468.01,
165, 174; 318/573, 568.12, 568.22, 568.2,
574, 563, 568.11, 568.16, 568.24; 901/1,
9, 2, 20, 29, 30, 49, 50, 10, 16

[56] References Cited

U.S. PATENT DOCUMENTS

| | | | |
|---|---|---|---|
| 4,661,797 | 4/1987 | Schmall | 901/49 |
| 4,697,979 | 10/1987 | Nakashima et al. | 395/80 |
| 4,870,590 | 9/1989 | Kawata | 395/84 |
| 4,956,790 | 9/1990 | Tsuchihashi et al. | 395/94 |
| 5,038,089 | 8/1991 | Szakaly | 395/94 |
| 5,051,676 | 9/1991 | Seki et al. | 395/92 |
| 5,231,693 | 7/1993 | Backes et al. | 395/84 |
| 5,293,322 | 3/1994 | Yagi et al. | 901/49 |
| 5,341,459 | 8/1994 | Backes | 395/84 |
| 5,410,638 | 4/1995 | Colgate et al. | 395/84 |
| 5,444,342 | 8/1995 | Matsuo et al. | 318/563 |
| 5,455,894 | 10/1995 | Conboy et al. | 395/82 |
| 5,495,410 | 2/1996 | Graf | 395/90 |
| 5,608,299 | 3/1997 | Hashimoto et al. | 318/568.11 |

OTHER PUBLICATIONS

Jie et al "Computer Monitoring and Control System of Robotic Assembly Line for Ceiling Fan–Motor".

*Primary Examiner*—Jacques H. Louis-Jacques
*Attorney, Agent, or Firm*—Staas & Halsey

[57] ABSTRACT

A robot system allows an operator to connect a peripheral to a robot controller without entering the operation range of a movable robot assembly. The robot controller has a data communication interface therein which is connected through a connector cable to a relay that is mounted on a safety cage. The relay has a connector for connecting a data communication cable to which a transmitter/receiver is connected. A peripheral such as a programmable logic controller or a personal computer is connected to the transmitter/receiver through a data communication cable. When the data communication cable connected to the transmitter/receiver is connected to the relay, the robot controller is connected to a network. The robot controller can easily be connected to the peripheral by connecting the data communication cable to the relay.

7 Claims, 3 Drawing Sheets

ROBOT SAFETY SYSTEM FOR CONNECTING PERIPHERAL DEVICE TO A ROBOT CONTROLLER

BACKGROUND OF THE INVENTION

(1) Field of the Invention

The present invention relates to a robot system, and more particularly, to a robot system comprising a movable robot assembly and a robot controller which are integrally combined with each other.

(2) Description of the Related Art

For controlling a movable robot assembly with a robot controller in a conventional robot system, it has been customary to electrically connect the movable robot assembly through a connector cable to the robot controller which is installed out of the operational range of the movable robot assembly, e.g., outside of a safety cage, and give operation commands from the robot controller through the connector cable to the movable robot assembly. The connector cable extends through a protective cable duct or slot defined in the floor on which the robot system is installed. The connector cable has its opposite ends connected to the robot controller and the movable robot assembly through respective connectors.

Since the movable robot assembly and the robot controller are spaced from each other, the robot system needs a space for placing the connector cable and a facility for protecting the connector cable. Another space for installing the robot controller therein is also required because the robot controller needs to be positioned outside of the operation range of the movable robot assembly.

One solution has been to connect the movable robot assembly and the robot controller directly to each other by respective connectors thereof. The robot controller is installed adjacent to the movable robot assembly in a dead space outside of the operation range of the movable robot assembly. Since this arrangement eliminates a space which would be needed to install the robot controller remotely from the movable robot assembly and also gets rid of any cable which would interconnect the movable robot assembly and the robot controller, the limited space and facility available for the robot system can effectively be utilized.

The robot system whose movable robot assembly and robot controller are integrally combined with each other is installed inside a safety cage for the safety of the operator. The safety cage surrounds the operation range of the movable robot assembly to prevent the operator from inadvertently entering the operation range of the movable robot assembly.

However, when a peripheral device such as a personal computer is to be connected to the robot controller, the operator has to enter the safety cage and do his job inside the safety cage. The space surrounded by the safety cage is not sufficiently large for the operator to carry out various tasks in connection with the robot system. When the operator carries out such tasks in the safety cage, the efficiency is very low because of the limited space available in the safety cage for the operator's intervention. Furthermore, from the standpoint of operator's safety, it is not preferable for the operator to be frequently called in to do some work within the operation range of the movable robot assembly.

SUMMARY OF THE INVENTION

It is therefore an object of the present invention to provide a robot system which allows an operator to connect a peripheral device to a robot controller without entering the operation range of a movable robot assembly.

To achieve the above object, there is provided in accordance with the present invention a robot system comprising a movable robot assembly movable within an operation range, a robot controller integrally combined with said movable robot assembly, a peripheral disposed outside of said operation range, a data communication cable connected to said peripheral for data communications with said robot controller, a connector cable connected to said robot controller for data communications with said peripheral, and a relay disposed outside of said operation range and having a connector for interconnecting said data communication cable and said connector cable.

An interface of the peripheral is disposed outside of the operation range of the movable robot assembly, and can effect data communications with the robot controller through the data communication cable. The relay, positioned outside of the operation range, is connected to the connector cable for the robot controller to effect data communications. The connector of the relay serves to connect the data communication cable to the connector cable.

To connect the robot controller to the peripheral, the data communication cable is connected to the connector of the relay. When the robot controller is thus connected to the peripheral, the robot controller can carry out data communications with the peripheral.

The above and other objects, features, and advantages of the present invention will become apparent from the following description when taken in conjunction with the accompanying drawings which illustrate a referred embodiment of the present invention by way of example.

DETAILED DESCRIPTION OF THE PREFERRED EMBODIMENT

Figure 1:
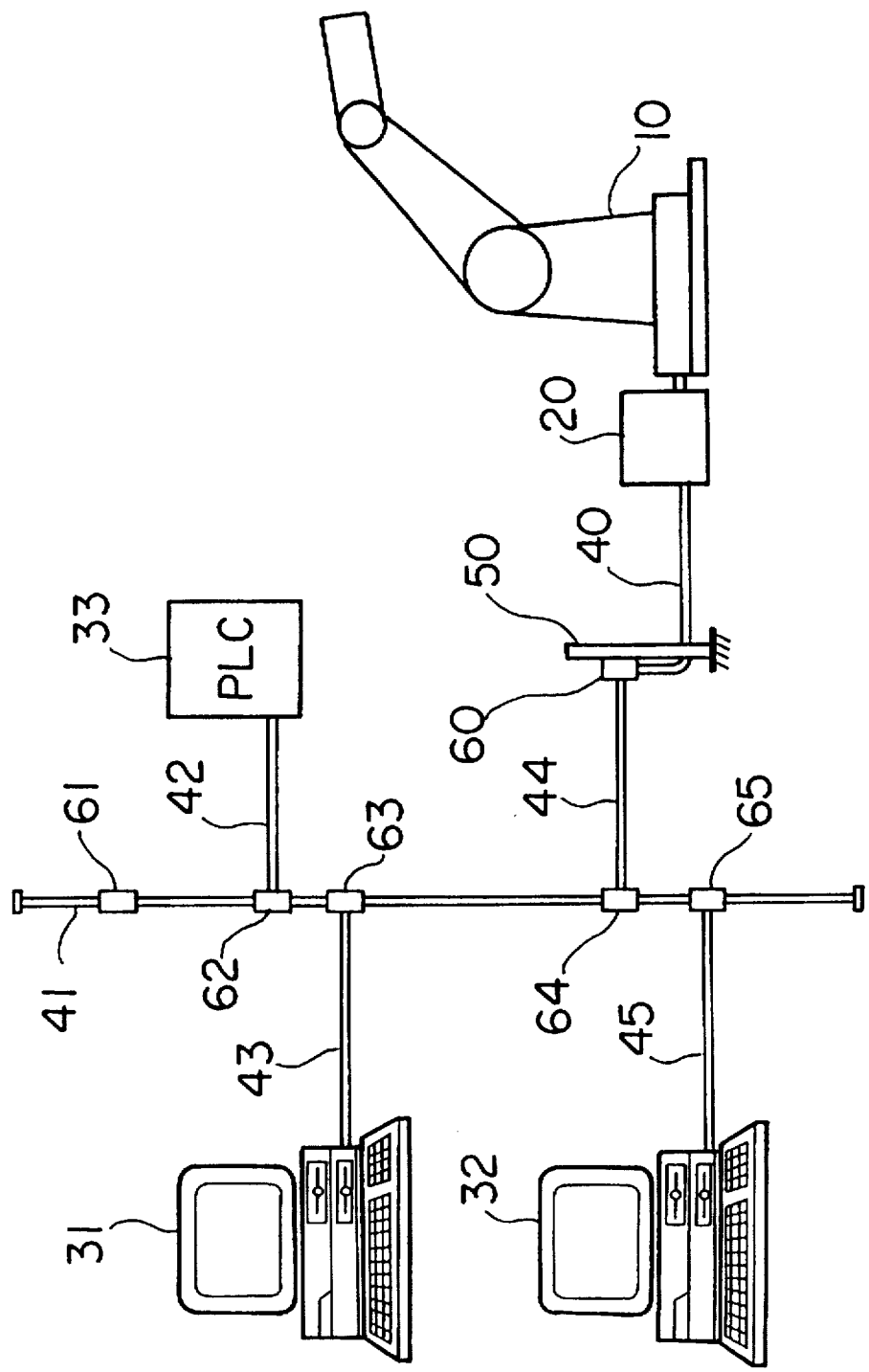
FIG. 1 is a view showing an arrangement of a robot system according to the present invention.

As shown in FIG. 1, a robot system according to the present invention is connected to a bus-type network having a data communication cable 41. The bus-type network may typically be Ethernet.

The robot system comprises a movable robot assembly 10 and a robot controller 20 which are positioned adjacent to each other. The robot system is surrounded by a circular safety cage 50. The robot controller 20 has a data communication interface therein which is connected through a connector cable 40 to a relay box 60 mounted on the safety cage 50. The relay box 60 has a connector to which a data communication cable 44 is connected.

The data communication cable 41 is connected to a plurality of transmitter/receivers 61, 62, 63, 64, 65 which receive signals from the data communication cable 41 and transmit the received signals to connected devices, and transmit signals from the connected devices to the data communication cable 41. To the transmitter/receivers 62, 63, 65, there are connected peripherals including a programmable logic controller (PLC) 33 and personal computers 31, 32 through respective data communication cables 42, 43, 45. These peripherals can effect data communications through the data communication cable 41.

When the data communication cable 44 connected to the transmitter/receiver 64 is connected to the relay box 60, the robot controller 20 is connected to the network. The relay box 60 is used to connect the robot controller 20 to any peripheral when it is newly added.

As described above, the robot controller 20 can be connected to the network by connecting, to the relay box 60, the data communication cable 44 which is located outside of the safety cage 50 and to which the personal computers 31, 32 and the PLC 33 are connected. Consequently, it is possible for the operator to connect peripherals to the robot controller 20 outside of the safety cage 50.

Since the transmitter/receiver 61 which is not used is connected to the data communication cable 41, a new peripheral can easily be added to the network by being connected to the transmitter/receiver 61.

Figure 2:
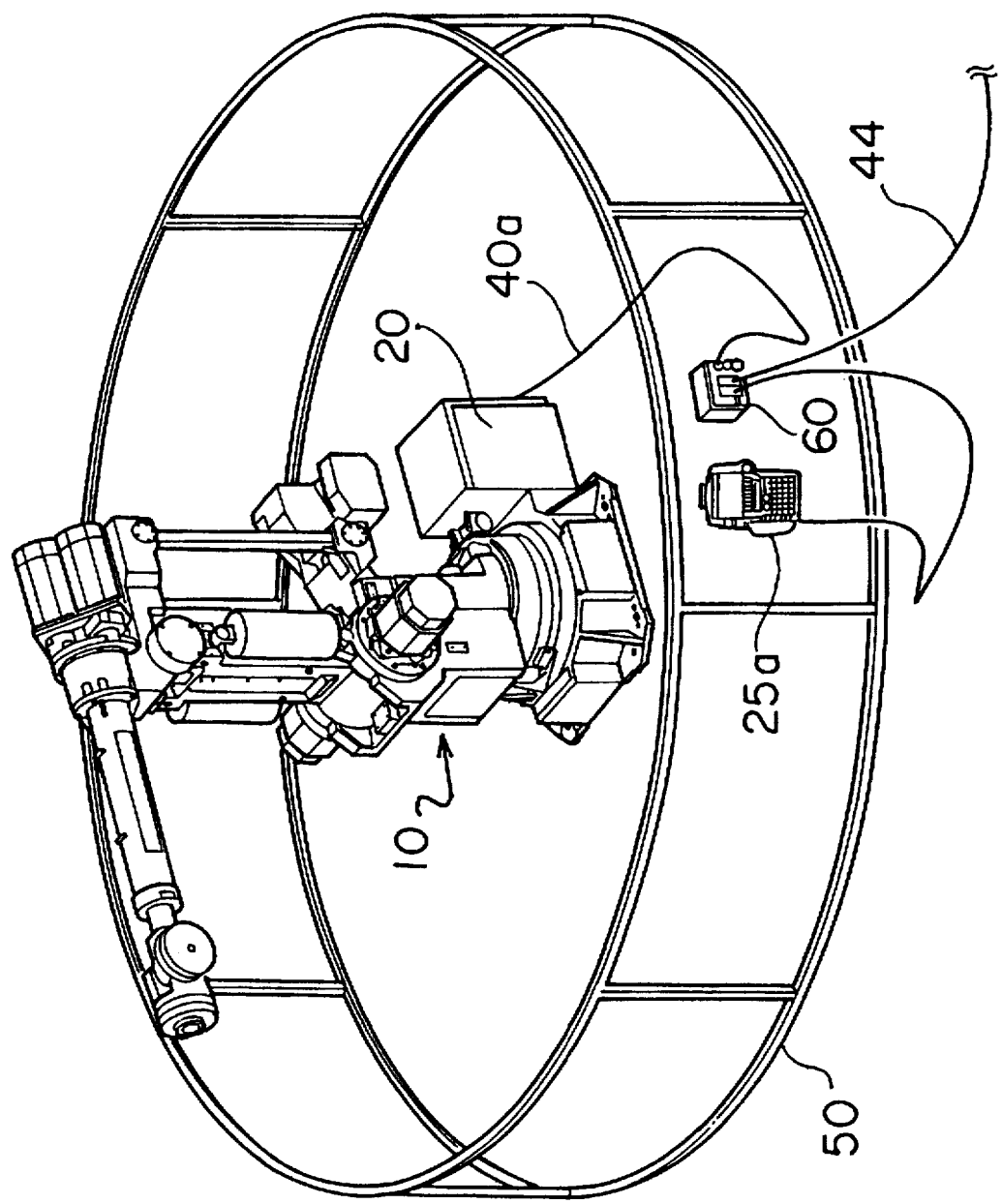
FIG. 2 is a perspective view of the robot system according to the present invention.

FIG. 2 shows the robot system in perspective. As shown in FIG. 2, the robot system composed of the movable robot assembly 10 and the robot controller 20 is installed in a space surrounded by the safety cage 50. The safety cage 50 is provided in order to prevent the operator from inadvertently entering the operation range of the movable robot assembly 10.

The relay box 60 is mounted on an outer surface of the safety cage 50. The relay box 60 is connected to the robot controller 20 by a connector cable 40a, and a teach control panel 25a with a display is connected to the relay 60. The data communication cable 44 is connected to the relay box 60. The connector cable 40a has two transmission lines, i.e., a transmission line from the data communication interface of the robot controller 20 and a transmission line which employs a serial port for inputting data from and outputting data to the teach control panel 25a.

Figure 3:
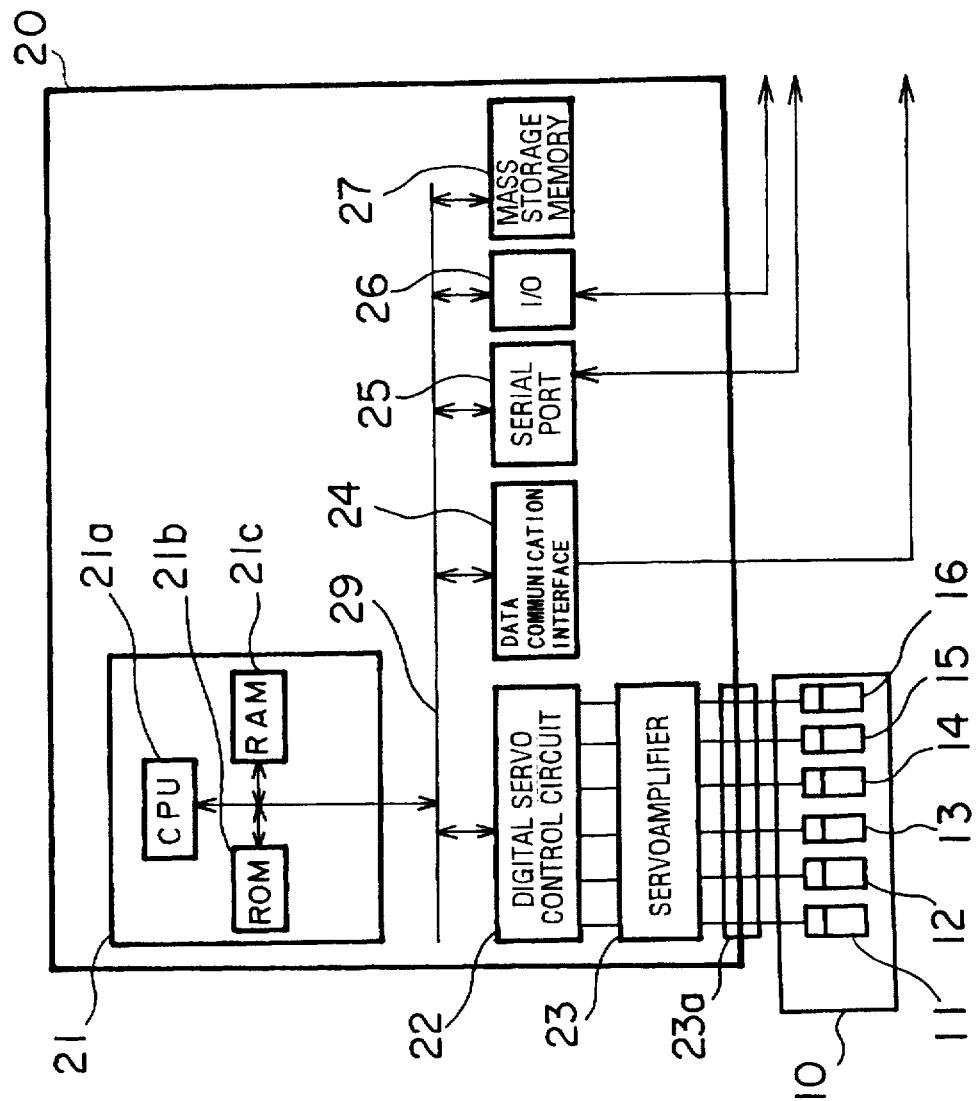
FIG. 3 is a block diagram of the robot system according to the present invention.

FIG. 3 shows the robot system in block form. As shown in FIG. 3, the movable robot assembly 10 is connected to the robot controller 20 through a connector 23a. The robot controller 20 has a processor board (control unit) 21 which comprises a processor (CPU) 21a, a read-only memory (ROM) 21b, and a random-access memory (RAM) 21c. The processor 21a controls the robot controller 20 in its entirety according to a system program that is stored in the read-only memory 21b. The random-access memory 21c temporarily stores various data, a robot teaching program, and coordinate system data. The random-access memory 21c has a portion serving as a nonvolatile memory which stores the robot teaching program or the coordinate system data. The processor board 21 is connected to a bus 29.

The robot controller 20 also has a digital servo control circuit 22 connected to the bus 29. Commands from the processor board 21 are supplied through the digital servo control circuit 22 and a servoamplifier 23 to servomotors 11, 12, 13, 14, 15, 16 which operate the movable robot assembly 10 about respective axes. The servoamplifier 23 has lamps and 7-segment displays for displaying failure conditions and positions for failure diagnosis. The servomotors 11, 12, 13, 14, 15, 16 are combined with respective pulse coders for detecting angular displacements thereof, and pulse signals generated by the pulse coders are fed back to the digital servo control circuit 22 through the connector 23a and the servoamplifier 23.

A serial port 25 is connected to the bus 29 and the teach control panel 25a (see FIG. 2). The teach control panel 25a is used to enter a teaching program or the like, and displays an error message on its display upon a failure of the robot controller 20. An I/O interface (I/O) 26 is connected to another command input device such as a control panel. Control signals from the command input device are transmitted through the I/O interface 26 and the bus 29 to the processor 21a. A mass storage memory 27 serves to store teaching data, operating conditions, etc.

A data communication interface 24 comprises an interface for data communications such as Ethernet. The robot controller 20 can access peripherals connected to the network through the data communication interface 24.

As described above, the robot controller 20 can be connected to desired peripherals by connecting the data communication cable 44, to which the peripherals are connected, to the relay box 60. Therefore, when a peripheral is to be added, the operator is not required to work within the safety cage 50, and hence a wide space is available for the operator to add the peripheral. Consequently, the robot system can easily be expanded with high efficiency. The operator is safe while working because he is not required to enter the safety cage 50.

The network for data communications has been illustrated as a bus-type network such as Ethernet. However, the network for data communications may be a network according to RS-232C. Since almost all personal computers have RS-232C communication interfaces, the robot controller 20 can easily be connected to peripherals such as personal computers by providing the relay box 60 with a connector which is connected to an RS-232C interface of the robot system.

With the present invention, as described above, the relay box 60 connected to the connector cable 40a for data communications of the robot controller 20 is positioned outside of the operation range of the movable robot assembly 10. Therefore, the robot controller 20 can be connected to the peripherals 31, 32, 33 by connecting the data communication cable 44, to which the peripherals 31, 32, 33 are connected, to the relay 60. The operator can thus connect a new peripheral to the robot controller 20 quite easily outside of the operation range of the movable robot assembly 10.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A robot system comprising:

a movable robot assembly movable within an operation range;

a robot controller integrally connected to said movable robot assembly;

a peripheral device disposed outside of said operation range;

a data communication cable connected to said peripheral device for data communications with said robot controller;

a connector cable connected to said robot controller for data communications with said peripheral device; and a relay disposed outside of said operation range and having a connector for interconnecting said data communication cable and said connector cable.

2. A robot system according to claim 1, further comprising a safety cage surrounding said operation range, said relay being mounted on an outer surface of said safety cage.

3. A robot system according to claim 1, further comprising a transmitter/receiver connected to said data communication cable for connection to said peripheral device or said robot controller.

4. A robot system according to claim 1, wherein said connector cable comprises a cable connected to said relay for said robot controller to effect data communications through Ethernet.

5. A robot system according to claim 1, wherein said connector cable comprises a cable connected to said relay for said robot controller to effect data communications according to RS-232C.

6. A robot system according to claim 1, wherein said peripheral device comprises a personal computer.

7. A robot system according to claim 1, wherein said peripheral device comprises a programmable logic controller.

* * * * *